(12) United States Patent
Schmidt et al.

(10) Patent No.: US 7,168,749 B2
(45) Date of Patent: Jan. 30, 2007

(54) MOVABLE PANEL ASSEMBLY

(75) Inventors: Robert M. Schmidt, Livonia, MI (US); John Stack, Shelby Township, MI (US)

(73) Assignee: Lear Corporation, Southfield, MI (US)

( * ) Notice: Subject to any disclaimer, the term of this patent is extended or adjusted under 35 U.S.C. 154(b) by 50 days.

(21) Appl. No.: 10/996,135

(22) Filed: Nov. 22, 2004

(65) Prior Publication Data

US 2006/0108823 A1   May 25, 2006

(51) Int. Cl.
*B60R 27/00* (2006.01)

(52) U.S. Cl. .............................. 296/24.34; 296/37.12; 296/70

(58) Field of Classification Search ............ 296/24.34, 296/191, 37.8, 37.12, 37.13, 70, 1.09; 340/815.51, 340/815.47, 815.83
See application file for complete search history.

(56) References Cited

U.S. PATENT DOCUMENTS

| | | | |
|---|---|---|---|
| 5,941,615 | A | 8/1999 | Ito et al. |
| 6,176,534 | B1 | 1/2001 | Duncan |
| 6,250,706 | B1 | 6/2001 | Davis, Jr. et al. |
| 7,021,691 | B1* | 4/2006 | Schmidt et al. ............... 296/70 |
| 2003/0052513 | A1 | 3/2003 | Uleski |
| 2005/0206182 | A1* | 9/2005 | DePue et al. ............ 296/37.12 |
| 2006/0060620 | A1* | 3/2006 | Schmidt et al. ........... 296/37.8 |
| 2006/0061123 | A1* | 3/2006 | Schmidt et al. ............... 296/70 |

FOREIGN PATENT DOCUMENTS

| | | |
|---|---|---|
| FR | 2 706 092 A1 | 12/1994 |
| JP | 11 078712 A | 3/1999 |
| JP | 11 268567 A | 10/1999 |
| JP | 2001-301526 A | 10/2001 |

* cited by examiner

*Primary Examiner*—Jason Morrow
(74) *Attorney, Agent, or Firm*—MacMillan, Sobanski & Todd, LLC

(57) ABSTRACT

A movable panel assembly for a vehicle includes a console mounted within the interior of a vehicle. A panel is movably mounted relative to the console. The panel has at least one electrical component mounted thereon. A flexible cable electrically connects the at least one component to a system of the vehicle. A retractor is movably mounted on the assembly. Movement of the retractor is induced by movement of the panel relative to the console, such that the flexible cable is guided by the retractor as the panel moves, so that the position of the flexible cable is controlled within the movable panel assembly in relation to the position of the panel.

20 Claims, 4 Drawing Sheets

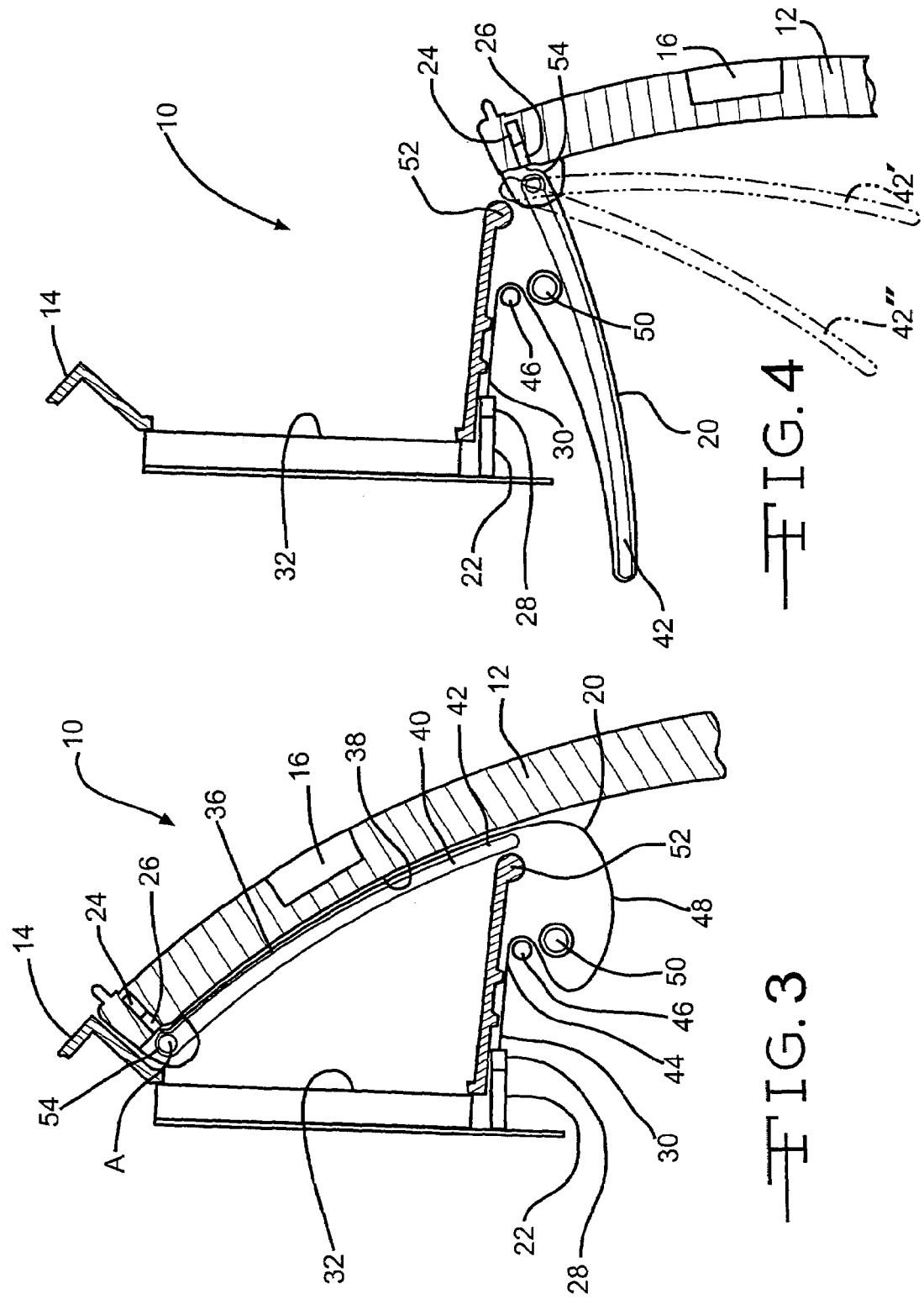

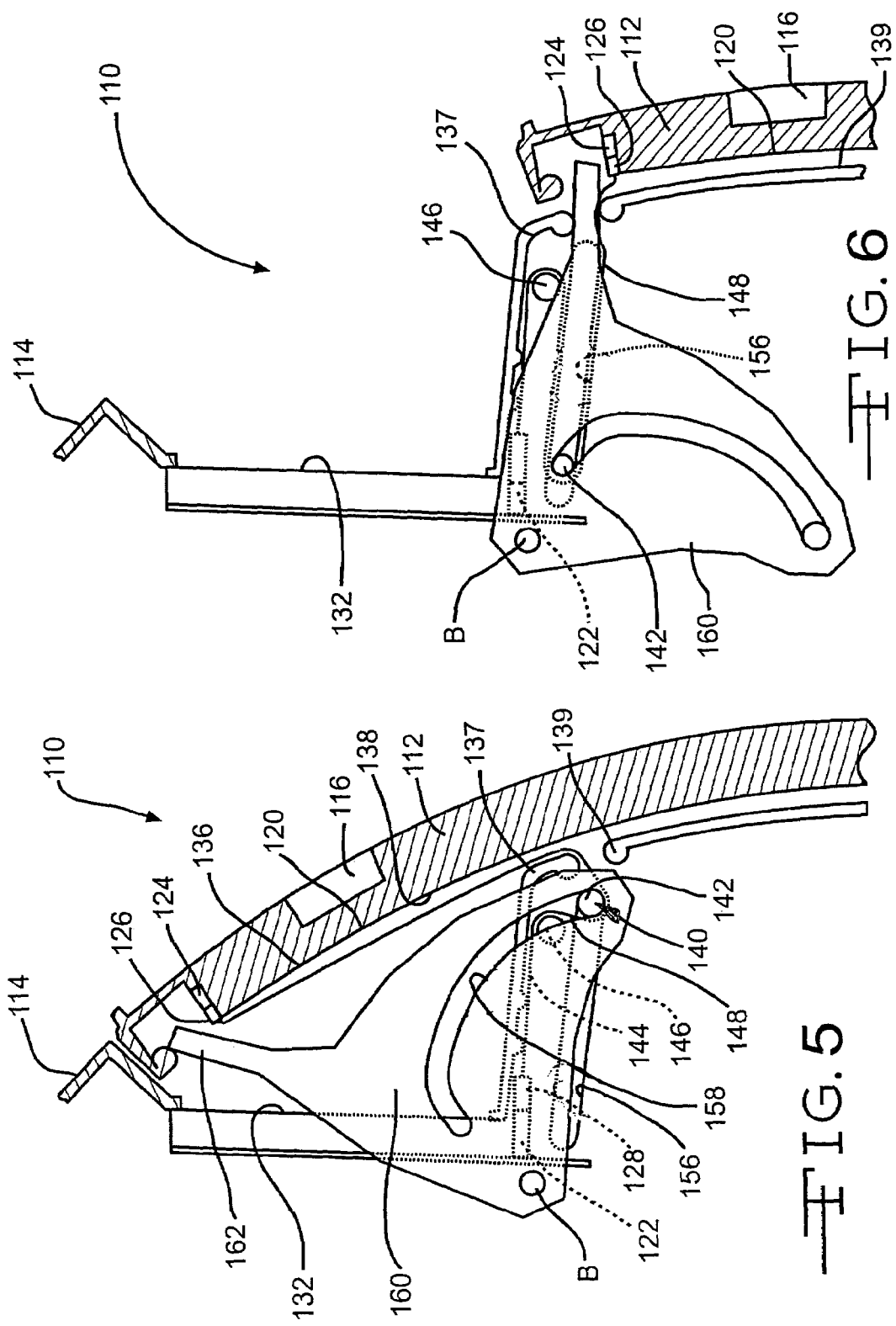

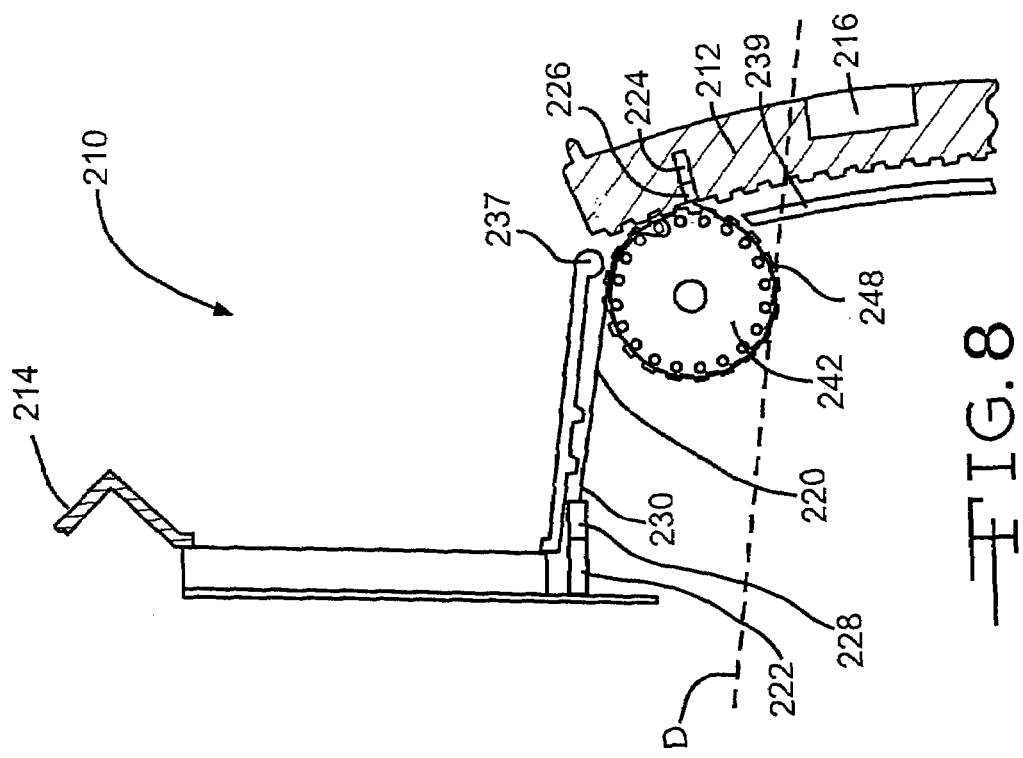
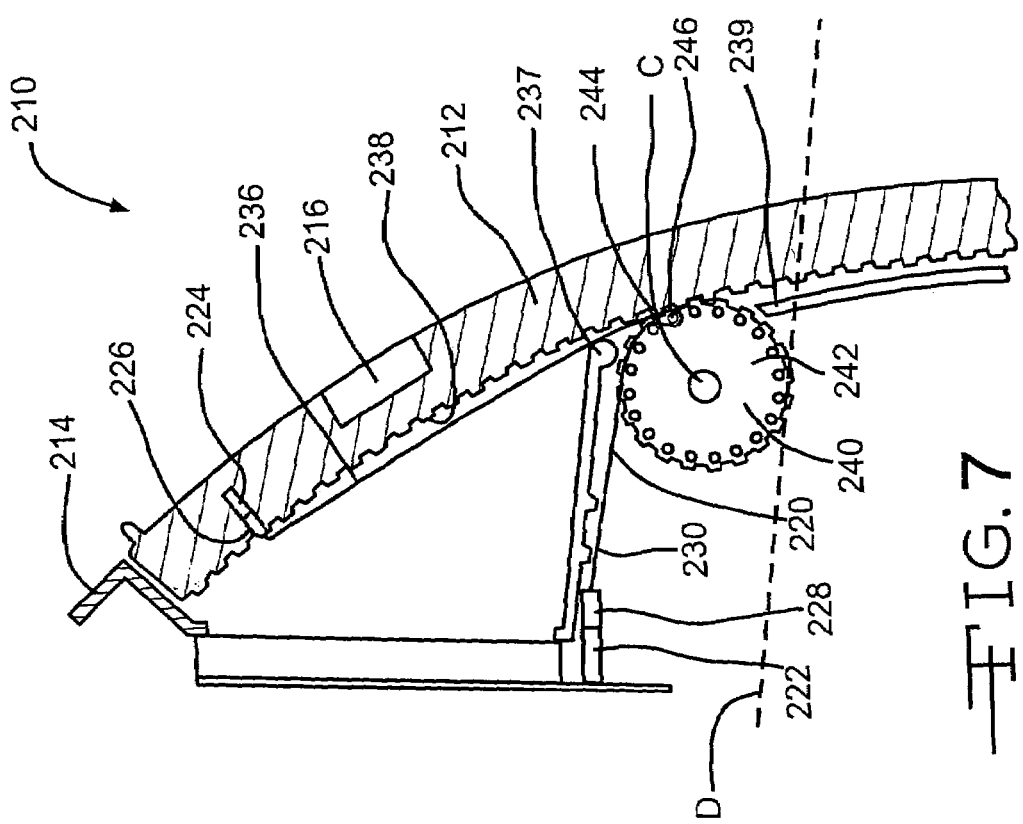

MOVABLE PANEL ASSEMBLY

BACKGROUND OF THE INVENTION

This invention relates in general to movable panels in vehicle interiors and, more specifically, to vehicle movable panels having flat flexible cables.

Movable panels are increasingly common in vehicle panel assemblies, such as instrument panels for the climate control, audio, video, or global positioning systems of a vehicle. Movable panels are generally movable to an open position to reveal additional controls or screens for controlling or monitoring a vehicle system. The movable panel may have controls and/or screens mounted thereon for use when the movable panel is in either or both of the open position and a closed position.

To connect the controls mounted on the movable panel to the desired systems of the vehicle, the movable panel may have a flat flexible cable extending from a side of the movable panel facing away from the interior passenger compartment of the vehicle. The flat flexible cable is connected at one end to the controls mounted on the movable panel and is connected at another end to a connection to the desired systems of the vehicle. The flat flexible cable may be of a length such that the flat flexible cable remains connected to the controls on the movable panel and the desired systems of the vehicle regardless of the position of the movable panel relative to the connection for the desired systems of the vehicle. Depending on the position of the movable panel relative to the desired systems of the vehicle, the amount of flat flexible cable required to connect the movable panel to the desired system of the vehicle may vary. However, the length of the flat flexible cable must accommodate connection of the movable panel to the desired systems of the vehicle when the movable panel is in a position furthest from the desired system of the vehicle. Therefore, when the movable panel is in all other positions except the position furthest from the desired system of the vehicle, the flat flexible cable will be longer than required to connect the controls of the movable panel to the desired systems of the vehicle. Thus, excess flat flexible cable should be contained out of view of the interior passenger compartment regardless of the position of the movable panel without effecting the function of the flat flexible cable or restricting the motion of the movable panel.

Traditionally, the excess portion of flat flexible cables of movable panels are allowed to loop behind the movable panel. To guide the loose portion of the flat flexible cables, the movement of the cable is pulled by spring tension. Although the spring tension reduces vibration and noise generated by the loose portions of the cable, the tension forces can cause damage or breakage to the cable.

BRIEF SUMMARY OF THE INVENTION

This invention relates to an assembly for a movable panel in a vehicle. The movable panel assembly includes a console mounted within the interior of a vehicle. A panel is movably mounted to the console. The panel has at least one electrical component mounted thereon. A flexible cable electrically connects the at least one component to a system of the vehicle. A retractor is movably mounted on the assembly. Movement of the retractor is induced by movement of the panel relative to the console, such that the flexible cable is guided by the retractor as the panel moves, so that the position of the flexible cable is controlled within the movable panel assembly in relation to the position of the panel.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a cross-sectional view of the movable panel assembly shown in FIGS. 1 and 2 in the closed position.

FIG. 4 is a cross-sectional view of the movable panel assembly shown in FIGS. 1 through 3 in the open position.

FIG. 5 is a cross-sectional view of a second embodiment of movable panel assembly in a closed position in accordance with the present invention.

FIG. 6 is a cross-sectional view of the movable panel assembly shown in FIG. 5 in an open position in accordance with the present invention.

FIG. 7 is a cross-sectional view of a third embodiment of movable panel assembly in a closed position in accordance with the present invention.

FIG. 8 is a cross-sectional view of the movable panel assembly shown in FIG. 7 in an open position in accordance with the present invention.

DETAILED DESCRIPTION OF THE PREFERRED EMBODIMENT

Figure 1:
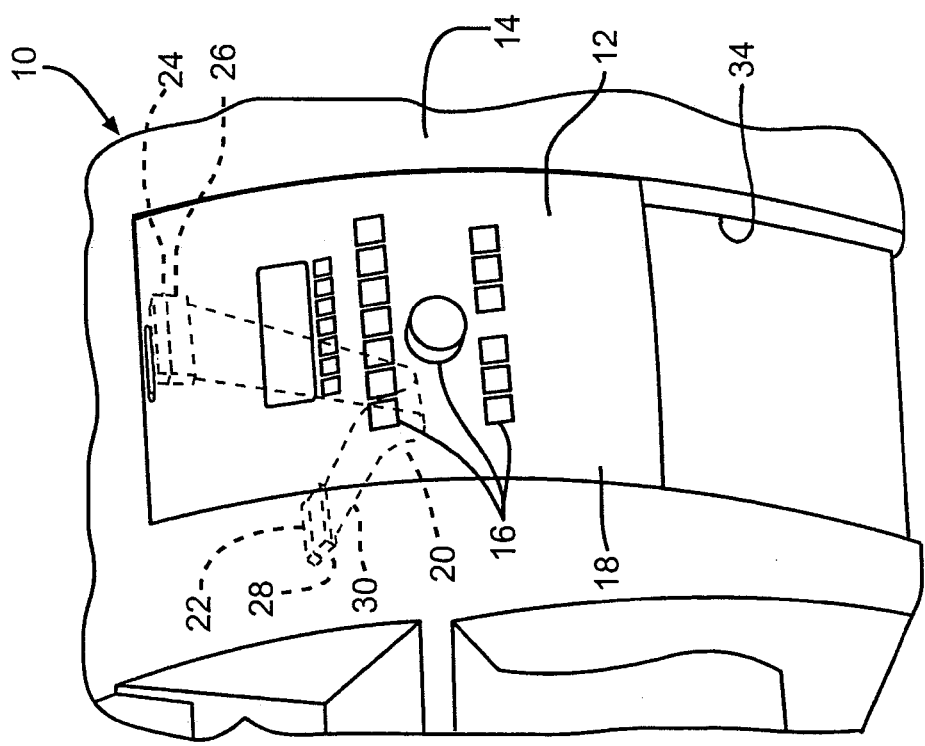
FIG. 1 is a perspective view of a movable panel assembly in a closed position in accordance with the present invention.

Referring now to the drawings, there is illustrated in FIG. 1 a movable panel assembly, indicated generally at 10, in accordance with the present invention. The movable panel assembly 10 includes a panel 12 movably attached to a console 14. As illustrated in FIG. 1, the panel 12 is in a closed position relative to the console 14. The panel 12 may include at least one electrical component 16 on a front face 18 of the panel 12 that is accessible from an interior passenger compartment (not shown) when the movable panel assembly 10 is installed within a vehicle. The at least one component 16 may be communicably connected by a flexible cable 20 extending from a back face of the panel 12 that is generally hidden from view from the interior passenger compartment when the movable panel assembly 10 is installed within a vehicle to at least one vehicle system, shown schematically at 22. Preferably, the flexible cable 20 is connected to the at least one component 16 of the panel 12 by a first connector 24 at a first end 26 and is connected to at least one vehicle system 22 by a second connector 28 at a second end 30. It will be appreciated that the first connector 24 and the second connector 28 are optional, and the flexible cable 20 may be communicably connected to the at least one component 16 and the at least one vehicle system 22 in any manner. Electrical cables or circuits (not shown) connect the first connector 24 to the various components.

In a preferred embodiment, the panel 12 is slidingly mounted to the console 14. However, the movable panel 12 may be mounted to the console 14 in any manner, such that the movable panel 12 may be movable relative to the console 14, as will be described below. For example, the movable panel 12 may be rotatably or pivotally mounted to the console 14.

In the exemplary embodiment illustrated, the console 14 is generally a center stack panel of an instrument panel of a vehicle. It will be appreciated however, that the console 14 of the subject invention may be any desired vehicle panel, such as other portions of an instrument panel, rear console, seat back, and the like. The illustrated console 14 is, in large measure, conventional in the art and is intended merely to illustrate one environment in which this invention may be used. Thus, the scope of this invention is not intended to be limited for use with the specific structure for the console 14 illustrated in FIGS. 1 and 2. On the contrary, as will become apparent below, this invention may be used in any desired environment for the purposes described below.

The components 16 may be any electrical or electronic devices, such as a switch or display device for any vehicle system. For example, the at least one component 16 may be an LCD screen for an audio system, a CD player for an audio system, and/or a switch for a climate control system.

The flexible cable 20 may be any known flexible cable suitable for electrically connecting the at least one component 16 to the at least one vehicle system 22. The first connector 24 and the second connector 28 may each, respectively, include a first connector portion attached to the flexible cable 20 and a second connector portion attached to one of the controls 16 and the at least one vehicle system, respectively, although such is not required. In the preferred embodiment, the flexible cable 20 is a flat flexible cable that is generally wider than it is thicker, although such is not required.

Figure 2:
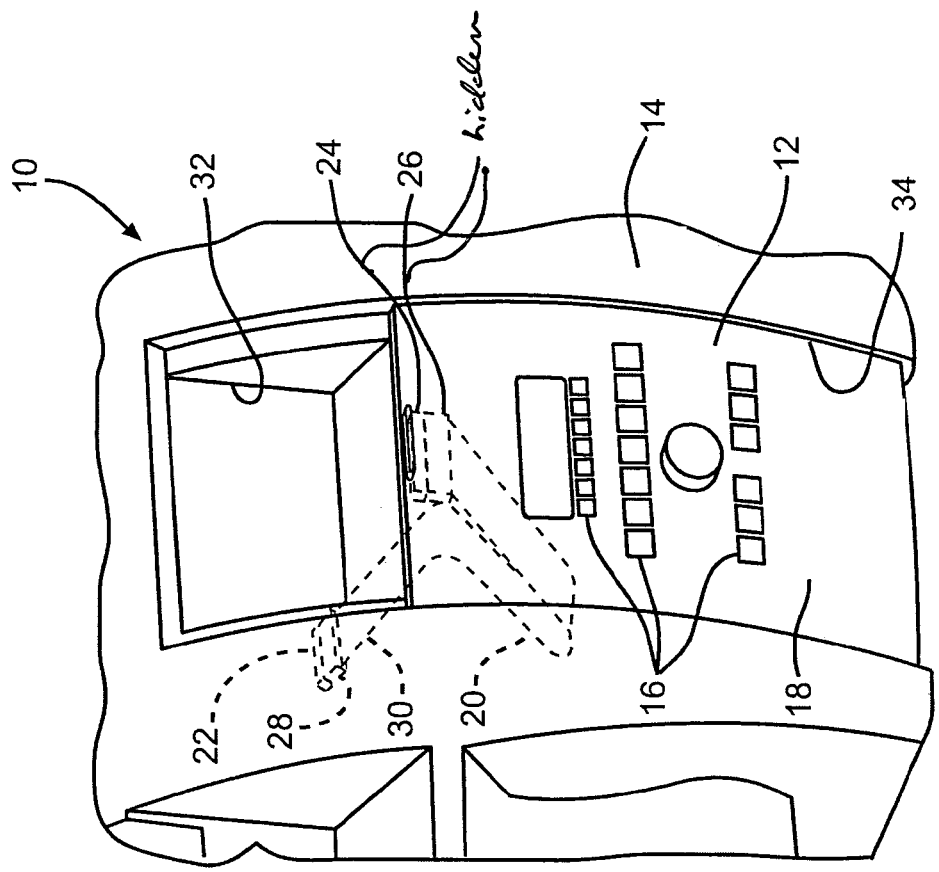
FIG. 2 is a perspective view of the movable panel assembly shown in FIG. 1 in an open position in accordance with the present invention.

The panel 12 is movable from the closed position, shown in FIG. 1, to an open position relative to the console 14, as illustrated in FIG. 2. In the open position, a first portion 32 of the console 14 is revealed by the panel 12. The first portion 32 is visible and/or accessible from the interior passenger compartment when the movable panel assembly 10 is installed within a vehicle. A second portion 34 of the console 14 made be concealed by the panel 12 when the panel 12 is in the open position, although such is not required. It will be appreciated that the flexible cable 20 preferably remains connected to the component 16 and the vehicle system 22 regardless of the position of the panel 12 relative to the console 14. It will also be appreciated that the panel 12 may be movable to a plurality of positions relative to the console 14 in which varying portions of the first portion 32 and the second portion 34 of the console 14 may be concealed or exposed by the panel 12.

Referring now to FIG. 3, the panel 12 is shown in the closed position. The flexible cable 20 is connected to the vehicle system 22 and the at least one component 16. An upper portion 36 of the flexible cable 20 is retained between an inner surface 38 of the panel 12 and a retractor 40. As illustrated, in the embodiment shown in FIGS. 1 through 4, the retractor 40 is comprised of an arm 42 pivotably mounted to the panel 12 about a pivot A. However, it will be appreciated that the retractor 40 may be any device capable of controlling at least a portion of the flexible cable 20 as the panel 12 moves. The arm 42 is disposed between the panel 12 and the console 14. A lower portion 44 of the flexible cable 20 is disposed about a guide pin 46. As shown in FIG. 3, the flexible cable 20 is directed over the top and right-hand portion of the pin 46. An intermediate portion or slack portion 48 of the flexible cable 20 is disposed about a lower and left-hand portion of a stopper 50, the purpose of the stopper 50 will be described below.

As the panel 12 moves from the closed position, shown in FIG. 3, to the open position, shown in FIG. 4, the arm 42 moves generally downwardly with the panel 12. A first track member 52, formed from the console 14, maintains the position of the arm 42 so that the arm 42 remains generally parallel to the inner surface 38 of the panel 12 during initial travel, as shown in FIG. 4 in phantom at 42'. Once the panel 12 and the arm 42 have moved generally vertically adjacent from the first track member 52, the arm 42 is optionally urged to rotate clockwise about the pivot A by an optional spring member 54 that guides the arm 42, as shown in phantom at 42". The spring member 54 guides the arm 42 to rotate in a clockwise direction until the arm 42 contacts the stopper 50, as shown in FIG. 4. The spring member 54 is preferably a torsional spring located on the arm 42 about the pivot A. As the arm 42 rotates, the flexible cable 20 remains disposed about the arm 42, such that the slack portion 48 of the flexible cable 20 is controlled by the arm 42. Thus, the cable 20 is guided by the arm 42 due to the motion of the panel 12.

When the panel 12 moves from the open position, shown in FIG. 4, to the closed position, shown in FIG. 3, the arm 42 rotates back to a position essentially parallel to the inner surface 38 of the panel 12. Then the arm 42 and panel 12 move upwardly together past the first track member 52 until the panel 12 reaches the open position. The flexible cable 20 is retained on the arm 42 such that the upper portion 36 of the flexible cable 20 is disposed again between the arm 42 and the inner surface 38 of the panel 12. When the panel 12 moves, the movement of the flexible cable 20 is controlled, but the tension on the flexible cable 20 is minimal or nullified. The retractor 40 controls the flexible cable 20 without inducing undesirable tensional stress in the flexible cable 20. Preferably, the length of the cable 20 is sufficient such that the cable is not under tension during movement, but is merely guided and directed by the arm 42.

Referring now to FIG. 5, there is illustrated a second embodiment of a movable panel assembly, indicated generally at 110, in accordance with the present invention. The movable panel assembly 110 is similar to the movable panel assembly 10 and only the components that differ will be described herein. Many of the components of the movable panel assembly 110 as illustrated in FIGS. 5 and 6 are similar in structure and function to corresponding components of the movable panel assembly 10 as illustrated in FIGS. 1 through 4. Therefore, such corresponding components are indicated by similar reference number in these Figures, but with the components of the movable panel assembly 110 as illustrated in FIGS. 5 and 6 having the addition of 100 to each reference number.

A panel 112 is movably mounted to a console 114 is shown in the closed position. The panel 112 includes at least one component 116. A flexible cable 120 is connected to a vehicle system 122 and the at least one component 16. Preferably, the flexible cable 120 is connected to the at least one component 116 of the panel 112 by a first connector 124 at a first end 126 and is connected to at least one vehicle system 122 by a second connector 128 at a second end 130. An upper portion 136 of the flexible cable 120 is disposed generally adjacent an inner surface 138 of the panel 112. The upper portion 136 is further disposed between a first guide member 137 and a second guide member 139. As illustrated, a retractor 140 is comprised of a sliding member, or more preferably a roller 142 slidingly or rollingly mounted to the assembly 110. However, it will be appreciated that the retractor 140 may be any device capable of controlling at least a portion of the flexible cable 120 as the panel 112 moves. A lower portion 144 of the flexible cable 120 is disposed about the lower portion of the roller 142, and also disposed about an upper portion of a guide pin 146. An intermediate portion or slack portion 148 of the flexible cable 120 is disposed about the roller 142, as will be described below.

The roller 142 may be disposed for movement within a first track 156. The roller 142 may be rollingly engaged with the track, or the roller 142 may be a non-rotating pin slidingly disposed in the track 156. As illustrated, the first track 156 is shaped to limit the movement of the roller 142 to generally linear movement, although such is not required. The roller 142 may also be disposed within a second track 158 of a cam 160. The cam 160 is pivotably mounted to the assembly 110 about a pivot B. An arm portion 162 of the cam 160 may be attached to the panel 112, such that the arm portion 162 is pivotable movable with the panel 112. It will be appreciated that the first track 156, the second track 158, and the cam 160 may be disposed adjacent the panel 112 within the console 114 or between the panel 112 and the console 114. It will be appreciated that the roller 142 may extend across the width of the panel 112, such that the roller 142 engages the first track 156 and the second track 158. It will further be appreciated that the a second retractor assembly (not shown), which may include a roller and track similar to the roller 142, the first track 156, the second track 158, and the cam 160, may be provided within the console 114 adjacent the panel 112 or between the panel 112 and the console 114 on the opposite side of the panel 112 as the retractor 140 and that the roller 142 may engage both the retractor 140 and the second retractor assembly (not shown).

As the panel 112 moves from the closed position, shown in FIG. 5, to the open position, shown in FIG. 6, the roller 142 is moved generally leftwardly caused by the rotation of the cam 160, as illustrated, away from the panel 112 and toward the pivot B. The first track 156 maintains the vertical position of the roller 142 so that the roller 142 remains generally fixed for vertical movement relative to the assembly 110. As the panel 112 moves, the second track 158 urges the roller 142 leftwardly, as illustrated, as the cam 160 is rotated about the axis B by the arm portion 162 attached to the panel 112. As the panel 112 moves downwardly, the roller 142 continues to move leftwardly until the panel 112 reaches the open position. As the roller 142 moves further leftwardly in the first track 156, the flexible cable 120 remains disposed about the roller 142, such that the slack portion 148 of the flexible cable 120 is controlled by the roller 142. Preferably, the length of the cable 120 is sufficient such that the cable is not under tension during movement, but is merely guided and directed by the roller 142.

When the panel 112 moves from the open position, shown in FIG. 6, to the closed position, shown in FIG. 5, the roller 142 moves generally rightwardly in the first track 156. The roller 142 moves rightwardly as the cam 160 rotates about axis B and the panel 112 moves upwardly until the panel 112 reaches the open position. The flexible cable 120 is retained about the roller 142 such that the upper portion 136 of the flexible cable 120 is disposed again adjacent the inner surface 138 of the panel 112. When the panel 112 moves, the movement of the flexible cable 120 is controlled, but the tension on the flexible cable 120 is minimal or nullified. The retractor 140 controls the flexible cable 120 without inducing undesirable tensional stress in the flexible cable 120.

Referring now to FIG. 7, there is illustrated a third embodiment of a movable panel assembly, indicated generally at 210, in accordance with the present invention. The movable panel assembly 210 is similar to the movable panel assembly 10 and only the components that differ will be described herein. Many of the components of the movable panel assembly 210 as illustrated in FIGS. 7 and 8 are similar in structure and function to corresponding components of the movable panel assembly 10 as illustrated in FIGS. 1 through 4. Therefore, such corresponding components are indicated by similar reference number in these Figures, but with the components of the movable panel assembly 210 as illustrated in FIGS. 7 and 8 having the addition of 200 to each reference number.

A panel 212 is movably mounted to a console 214 is shown in the closed position. The panel 212 includes at least one component 216. A flexible cable 220 is connected to a vehicle system 222 and the at least one component 216. Preferably, the flexible cable 220 is connected to the at least one component 216 of the panel 212 by a first connector 224 at a first end 226 and is connected to at least one vehicle system 222 by a second connector 228 at a second end 230. An upper portion 236 of the flexible cable 220 is disposed generally adjacent an inner surface 238 of the panel 212. The upper portion 236 is further disposed between a first guide member 237 and a second guide member 239.

As illustrated, a retractor 240 is comprised of a gear wheel 242 mounted to the assembly 210 for rotation about a pivot C. However, it will be appreciated that the retractor 240 may be any device capable of controlling at least a portion of the flexible cable 220 as the panel 212 moves. A lower portion 244 of the flexible cable 220 is disposed about a guide pin 246. The guide pin 246 is disposed on the gear wheel 242. As shown in FIG. 7, the cable is generally disposed about the right-hand side, bottom, and left-hand side of the pin 246. As best shown in FIG. 8, an intermediate portion or slack portion 248 of the flexible cable 220 is disposed about the gear wheel 242, as will be described below.

The gear wheel 242 may include a plurality of teeth 280 disposed about the circumference of the gear wheel 242. The gear wheel 242 may also include a plurality of pegs 282 extending outwardly from a surface of the gear wheel 242 is a circumferential fashion. Preferably, the pegs 282 are spaced slightly radially inwardly from the edge of the gear wheel 242. As the panel 212 moves from the closed position, shown in FIG. 7, to the open position, shown in FIG. 8, the plurality of teeth 280 of the gear wheel 242 are engaged by a plurality of teeth 284 extending from the inner surface 238 of the panel 212. The gear wheel 242 is rotated in a clockwise manner by the downward movement of the panel 212. As the gear wheel 242 rotates, the flexible cable 220 slides around the guide pin 246 and the slack portion 248 is disposed about the plurality of pegs 282 of the gear wheel 242, such that the slack portion 248 of the flexible cable 220 is controlled by the gear wheel 242. Thus, the guide pin 246 pushes the looped around portion of the cable 220 as the wheel rotates.

When the panel 212 moves from the open position, shown in FIG. 8, to the closed position, shown in FIG. 7, the gear wheel 242 is rotated counter-clockwise by the movement of the panel 212 about the axis C. The flexible cable 220 is unwound from the gear wheel 242 as the gear wheel 242 rotates, so that the panel 212 may move upwardly. When the panel 212 moves, the movement of the flexible cable 220 is controlled, but the tension on the flexible cable 220 is minimal or nullified. The retractor 240 controls the flexible cable 220 without inducing undesirable tensional stress in the flexible cable 220. Preferably, the length of the cable 220 is sufficient such that the cable is not under tension during movement, but is merely guided and directed by the pin 246.

As shown in FIGS. 7 and 8, the flexible cable 220 and the retractor 240 preferably do not extend vertically below the line D. The design of the retractor 240 reduces the overlap of the panel 212 relative to the console 214 required to obscure the view of the flexible cable 220 and the retractor 240 from the interior passenger compartment of a vehicle when the assembly 210 is installed in a vehicle yet controls the position of the flexible cable 220 in relation to the position of the panel 212.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A movable panel assembly for a vehicle comprising:
   a console mounted within the interior of a vehicle, the console having a first portion and a second portion;
   a panel movably mounted relative to the console such that the panel is movable to an open position, wherein the first portion of the console is visible from the interior of the vehicle and the second portion of the console is concealed from the interior of the vehicle, and a closed position, wherein the first portion of the console is concealed from the interior of the vehicle and the second portion of the console is visible from the interior of the vehicle, the panel having at least one electrical component mounted thereon;
   a flexible cable for electrically connecting the at least one component to a system of the vehicle; and
   a retractor movably mounted on the assembly, wherein movement of the retractor is induced by movement of the panel relative to the console, such that the flexible cable is guided by the retractor as the panel moves, so that the position of the flexible cable is controlled within the movable panel assembly in relation to the position of the panel.

2. The assembly according to claim 1, wherein the flexible cable is guided by the panel and the retractor as the panel moves.

3. The assembly according to claim 1, wherein the retractor includes an arm pivotably mounted to the panel.

4. The assembly according to claim 3, wherein the arm is disposed within a track mounted to the console to guide the movement of the arm relative to the assembly.

5. The assembly according to claim 3, wherein the arm is disposed substantially flush to an inner surface of the panel when the panel is in a closed position relative to the console.

6. The assembly according to claim 3, wherein the arm is disposed substantially perpendicular to the inner surface of the panel when the panel is in an open position relative to the console.

7. The assembly according to claim 3, wherein the flexible cable is disposed adjacent at least a portion of an inner surface of the panel when the panel is in a closed position relative to the console.

8. The assembly according to claim 3, wherein the flexible cable is disposed substantially adjacent a side of the arm when the panel is in an open position relative to the console.

9. The assembly according to claim 1, wherein the retractor includes a member disposed within a track mounted to the console for movement within the track.

10. The assembly according to claim 9, wherein the member is a roller rollingly engaged with the track.

11. The assembly according to claim 9, wherein the track is comprised of a cam having a first arm pivotably mounted to the console about a first axis and a second arm connected to the panel, such that the cam pivots about the first axis as the panel moves relative to the console.

12. The assembly according to claim 11, wherein the track is further comprised of a linear groove, such that the movement of the cam induces linear movement of the roller.

13. The assembly according to claim 12, wherein the flexible cable is disposed generally about both sides of the linear groove when the panel is in an open position relative to the console.

14. The assembly according to claim 12, wherein the flexible cable is disposed adjacent at least a portion of an inner surface of the panel when the panel is in a closed position relative to the console.

15. The assembly according to claim 1, wherein the retractor is a gear wheel mounted to the console for rotation.

16. The assembly according to claim 15, wherein the panel includes a plurality of teeth extending outwardly from an inner surface of the panel for engagement with a plurality of teeth extending from the gear wheel.

17. The assembly according to claim 15, wherein the gear wheel includes a plurality of pegs extending outwardly from a surface of the gear wheel for engaging the flexible cable.

18. The assembly according to claim 15, wherein the flexible cable is disposed about the gear wheel when the panel is in an open position relative to the console.

19. The assembly according to claim 15, wherein the flexible cable is disposed adjacent at least a portion of an inner surface of the panel when the panel is in a closed position relative to the console.

20. A movable panel assembly for a vehicle comprising:
   a console mounted within the interior of a vehicle;
   a panel movably mounted relative to the console, the panel having at least one electrical component mounted thereon;
   a flexible cable for electrically connecting the at least one component to a system of the vehicle; and
   a retractor movably mounted on the assembly, the retractor including a gear wheel, wherein movement of the retractor is induced by movement of the panel relative to the console, such that the flexible cable is guided by the retractor as the panel moves, so that the position of the flexible cable is controlled within the movable panel assembly in relation to the position of the panel.

* * * * *